(12) United States Patent
Kishimoto

(10) Patent No.: US 6,540,641 B2
(45) Date of Patent: Apr. 1, 2003

(54) SPEED REDUCER

(75) Inventor: Kazuhiro Kishimoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 60 days.

(21) Appl. No.: 09/817,200

(22) Filed: Mar. 27, 2001

(65) Prior Publication Data

US 2001/0024991 A1 Sep. 27, 2001

(30) Foreign Application Priority Data

Mar. 27, 2000 (JP) .......................................... 2000-086519

(51) Int. Cl.[7] .............................................. F16H 57/08
(52) U.S. Cl. ........................................ 475/342; 475/347
(58) Field of Search ................................ 475/334, 342, 475/347, 341, 332

(56) References Cited

U.S. PATENT DOCUMENTS

| 3,008,355 A | * | 11/1961 | Grudin .......................... 475/334 |
| 3,633,441 A | * | 1/1972 | Hicks ............................ 475/334 |
| 3,640,150 A | * | 2/1972 | Leiner et al. ................ 475/332 |
| 4,751,855 A | * | 6/1988 | Hudson et al. .............. 475/332 |
| 4,825,723 A | * | 5/1989 | Martin .......................... 475/332 |
| 4,843,912 A | * | 7/1989 | Quick ........................... 475/342 |
| 4,932,613 A | * | 6/1990 | Tiedman et al. ............ 475/334 |
| 5,106,354 A | * | 4/1992 | Russ et al. ................... 475/342 |

FOREIGN PATENT DOCUMENTS

JP 8-303531 11/1996

* cited by examiner

*Primary Examiner*—Douglas C. Butler
*Assistant Examiner*—Thomas J. Williams

(57) ABSTRACT

A mechanical paradox planetary speed reducer has an input shaft, a plurality of plantet gears, a pair of fixed internal sun gears, and a movable internal sun gear. The fixed internal sun gears are spaced from each other in the axial direction of the input shaft, and the movable internal sun gear is disposed between the fixed internal sun gears. The movable internal sun gear has outer flanges on opposite ends thereof and fitted over the ends of the fixed internal sun gears in sliding contact therewith, holding the movable internal sun gear and the fixed internal sun gears in concentric relation to each other.

5 Claims, 3 Drawing Sheets

SPEED REDUCER

BACKGROUND OF THE INVENTION

1. Field of the Invention

The present invention relates to a speed reducer, and more particularly to a mechanical paradox planetary speed reducer.

2. Description of the Related Art

One mechanical paradox planetary speed reducer disclosed in Japanese laid-open patent publication No. 8-303531 comprises an external sun gear fixedly mounted on an input shaft, a fixed internal sun gear disposed around the external sun gear and nonrotatably fixed to a casing, a plurality of planet gears disposed between and meshing with the external sun gear and the fixed internal sun gear, and a movable internal sun gear rotatably positioned in juxtaposed relation to the fixed internal sun gear in the axial direction of the input shaft and held in mesh with the planet gears. The rotation of the input shaft is transmitted at a speed reduction ratio via the fixed internal sun gear and the planet gears to the movable internal sun gear, from which the rotation is outputted via an output gear to an output shaft.

The disclosed speed reducer is advantageous in that it is small in size, but provides a large speed reduction ratio.

In the conventional mechanical paradox planetary speed reducer disclosed in Japanese laid-open patent publication No. 8-303531, the fixed internal sun gear and the movable internal sun gear are completely separate from each other. Therefore, while the speed reducer is in operation, the fixed internal sun gear and the movable internal sun gear may possibly be displaced out of coaxial alignment with each other. When the fixed internal sun gear and the movable internal sun gear are misaligned, each of the gears is subject to undue stresses, causing the speed reducer to operate unstably and reducing the service life of the speed reducer.

When the conventional mechanical paradox planetary speed reducer is assembled, it is difficult to keep the fixed internal sun gear and the movable internal sun gear in concentric relation to each other. Therefore, it tends to be tedious and time-consuming to bring these internal sun gears into mesh with the planet gears in the process of assembling the conventional mechanical paradox planetary speed reducer.

SUMMARY OF THE INVENTION

It is therefore an object of the present invention to provide a speed reducer which allows fixed internal sun gears and a movable internal sun gear to be reliably and easily kept concentric to each other when the speed reducer is in operation or is assembled, so that the speed reducer can operate stably and can be assembled with ease.

To achieve the above object, there is provided in accordance with the present invention a speed reducer comprising an external sun gear fixed to an input shaft, a pair of fixed internal sun gears nonrotatably fixed in position and disposed around the external sun gear, a plurality of planet gears interposed between and held in mesh with the external sun gear and the fixed internal sun gears, and a movable internal sun gear rotatably disposed in juxtaposed relation to the fixed internal sun gears in an axial direction of the input shaft and held in mesh with the planet gear, whereby the rotation of the input shaft can be transmitted at a speed reduction ratio to the movable internal sun gear, the fixed internal sun gears being spaced from each other in the axial direction of the input shaft, the movable internal sun gear being disposed between the fixed internal sun gears, the movable internal sun gear having ends confronting respective ends of the fixed internal sun gears, the ends of the movable internal sun gear and the ends of the fixed internal sun gears being held in sliding contact each other to hold the movable internal sun gear and the fixed internal sun gears in concentric relation to each other.

With the above arrangement, since the movable internal sun gear and the fixed internal sun gears are concentrically held in sliding contact with each other, the movable internal sun gear and the fixed internal sun gears remain stably concentric each other while the speed reducer is in operation. In assembling the speed reducer, the movable internal sun gear and the fixed internal sun gears remain concentric to each other when they are held in fitting engagement with each other. Consequently, they can smoothly be brought into mesh with the planet gears, and hence the speed reducer can smoothly be assembled.

Therefore, the fixed internal sun gears and the movable internal sun gear are reliably and easily held in concentric relation to each other when the speed reducer is in operation or is assembled. The speed reducer can thus operate stably, and can be assembled with ease.

According to a specific engaging structure, one of the ends of the movable internal sun gear and the ends of the fixed internal sun gears which confront the ends of the movable internal sun gear has an outer flange fitted over the other confronting end in sliding contact therewith.

Since the outer flange of one of the ends of the movable internal sun gear and the ends of the fixed internal sun gears is fitted over the other confronting end in sliding contact therewith, one of the movable internal sun gear and the fixed internal sun gears is prevented from being relatively displaced from the others in a direction perpendicular to their axes. Therefore, the movable internal sun gear and the fixed internal sun gears are steadily kept concentric to each other.

According to another specific engaging structure, the ends of the movable internal sun gear have respective slanted surfaces on end faces thereof, and the ends of the fixed internal sun gears which confront the ends of the movable internal sun gear have respective slanted surfaces on end faces thereof, the slanted surfaces being inclined to the axis of the input shaft and held in sliding contact with each other.

The slanted surfaces of the movable internal sun gear and the fixed internal sun gears engage each other to prevent one of the internal sun gears from being relatively displaced from the others in a direction perpendicular to their axes. Therefore, the movable internal sun gear and the fixed internal sun gears are steadily kept concentric to each other.

According to still another specific engaging structure, the speed reducer further includes rolling bearing mechanisms interposed between the ends of the movable internal sun gear and the ends of the fixed internal sun gears which confront the ends of the movable internal sun gear, for assisting the movable internal sun gear in rotating with respect to the fixed internal sun gears.

The rolling bearing mechanisms interposed between the movable internal sun gear and the fixed internal sun gears are effective to prevent one of the internal sun gears from being relatively displaced from the others in a direction perpendicular to their axes. Therefore, the movable internal sun gear and the fixed internal sun gears are steadily kept concentric to each other. The rolling bearing mechanisms allow the movable internal sun gear to rotate smoothly with respect to the fixed internal sun gears.

The above engaging structures may be used in combination in the speed reducer.

Each of the ends of the movable internal sun gear and the ends of the fixed internal sun gears which are held in sliding contact with each other has a self-lubricating coating.

The self-lubricating coating can sufficiently reduce the friction caused by the sliding contact between the ends of the movable internal sun gear and the ends of the fixed internal sun gears, allowing the movable internal sun gear to rotate smoothly.

The self-lubricating coating may comprise a coating of PTFE (polytetrafluoroethylene) or molybdenum disulfide, for example.

The above and other objects, features, and advantages of the present invention will become apparent from the following description when taken in conjunction with the accompanying drawings which illustrate preferred embodiments of the present invention by way of example.

DETAILED DESCRIPTION OF THE PRFERRED EMBODIMENTS

A speed reducer according to a first embodiment of the present invention will be described below with reference to FIG. 1.

Figure 1:
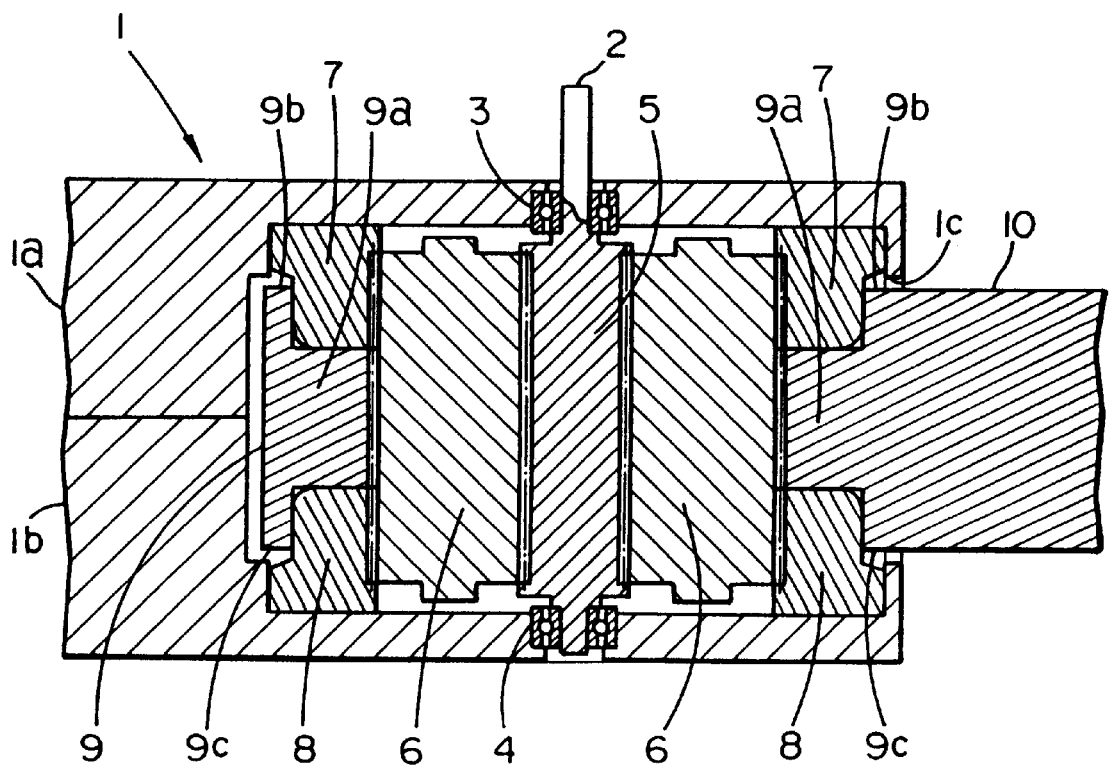
FIG. 1 is an axial cross-sectional view of a speed reducer according to a first embodiment of the present invention.

As shown in FIG. 1, a speed reduce according to a first embodiment of the present invention has a housing 1 and an input shaft 2 having an intermediate portion housed in the housing 1 and opposite ends rotatably supported in the housing 1 by respective bearings 3, 4. The end of the input shaft 2 which is supported by the bearing 3 projects out of the housing 1. Some rotational power from an external device, not shown, is applied to the projecting end of the input shaft 2 by a pulley or the like, not shown.

The housing 1 comprises a pair of housing members 1a, 1b supporting the bearings 3, 4, respectively. The housing members 1a, 1b are joined to each other at end faces thereof in the axial direction of the input shaft 2 and fastened to each other by bolts or the like, not shown.

The speed reducer has an external sun gear 5 disposed on the intermediate portion of the input shaft 2 and having external teeth on its outer circumferential surface. The external sun gear 5 extends in the axial direction of the input shaft 2 and is concentrically integral with the input shaft 2.

The speed reducer also has, in the housing 1, a plurality of (two in the embodiment) planet gears 6 held in mesh with the external sun gear 5, and a pair of fixed internal sun gears 7, 8 and a movable internal sun gear 9 which are held in mesh with the planet gears 6.

Each of the fixed internal sun gears 7, 8 is in the form of a cylinder with internal teeth on its inner circumferential surface. The fixed internal sun gears 7, 8 are disposed concentrically around the external sun gear 5 on the input shaft 2 and axially spaced from each other in respective positions where they are held against inner wall surfaces of the housing 1 near the bearings 3, 4, respectively. The fixed internal sun gears 7, 8 are nonrotatably fixed to the housing 1 by bolts or the like, not shown. The fixed internal sun gears 7, 8 have identical inside diameters and identical numbers of teeth. The fixed internal sun gears 7, 8 have mutually confronting end faces lying perpendicularly to the axis of the input shaft 2.

Each of the planet gears 6 is of an axial length that is substantially the same as the axial length of the external sun gear 5, and is in the form of a solid cylinder. The planet gears 6 are disposed between the fixed internal sun gears 7, 8 and the external sun gear 5 and spaced from each other in the circumferential direction of the fixed internal sun gears 7, 8 and the external sun gear 5. The planet gears 6 extend axially parallel to the input shaft 2, and are held in mesh with the fixed internal sun gears 7, 8 and the external sun gear 5.

The movable internal sun gear 9 comprises a cylindrical main body 9a with internal teeth on its inner circumferential surface and a pair of cylindrical outer flanges 9b, 9c extending concentrically and integrally from the respective axially opposite ends of the cylindrical main body 9a.

The cylindrical main body 9a is of an axial length that is essentially the same as the axial spacing between the fixed internal sun gears 7, 8 secured to the housing 1, and of an inside diameter that is essentially the same as the inside diameter of the fixed internal sun gears 7, 8. The cylindrical main body 9a is disposed concentrically around the external sun gear 5 on the input shaft 2 and axially positioned concentrically between the fixed internal sun gears 7, 8. The cylindrical main body 9a is held in mesh with the planet gears 6. The cylindrical main body 9a has axially opposite end faces lying perpendicularly to the axis of the input shaft 2 and held in sliding contact with the confronting end faces of the fixed internal sun gears 7, 8.

The outer flanges 9b, 9c of the movable internal sun gear 9 have an inside diameter which is substantially the same as the outside diameters of the axial ends of the fixed internal sun gears 7, 8. The outer flange 9b is fitted over the end of the fixed internal sun gear 7 such that the inner circumferential surface of the outer flange 9b is held in sliding contact with the outer circumferential surface of the end of the fixed internal sun gear 7. Similarly, the outer flange 9c is fitted over the end of the fixed internal sun gear 8 such that the inner circumferential surface of the outer flange 9c is held in sliding contact with the outer circumferential surface of the end of the fixed internal sun gear 8. Stated otherwise, the ends of the fixed internal sun gears 7, 8 are fitted respectively in the outer flanges 9b, 9c in sliding contact therewith.

In the present embodiment, each of the sliding contact surfaces of the movable internal sun gear 9 and the fixed internal sun gears 7, 8, i.e., each of the axially opposite end faces of the cylindrical main body 9a, the axially opposite end faces of the fixed internal sun gears 7, 8, the inner circumferential surfaces of the outer flanges 9b, 9c, and the outer circumferential surfaces of the ends of the fixed internal sun gears 7, 8 has a self-lubricating coating of PTFE (polytetrafluoroethylene) or molybdenum disulfide, for example.

The speed reducer according to the first embodiment is used in a finger joint of a hand of a robot, not shown, for example. An arm 10 that is swingable in unison with angular movement of the movable internal sun gear 9 is integrally formed with an outer circumferential surface of the movable internal sun gear 9. The arm 10 extends out of the housing 1 through an opening 1c defined in a side wall of the housing 1, and is connected to another joint of the robot hand.

As described above, the outer flanges 9b, 9c are fitted respectively over the ends of the fixed internal sun gears 7, 8 thereby holding the movable internal sun gear 9 and the fixed internal sun gears 7, 8 in concentric relation to each other. While the speed reducer is in operation, therefore, the movable internal sun gear 9 and the fixed internal sun gears 7, 8 are stably held concentric to each other, and do not suffer undue stresses. Accordingly, the speed reducer can operate smoothly and stably.

Since each of the sliding contact surfaces of the movable internal sun gear 9 and the fixed internal sun gears 7, 8 has a self-lubricating coating, the friction caused by those sliding contact surfaces is minimized. Therefore, the rotation can efficiently and smoothly be transmitted from the input shaft 2 to the movable internal sun gear 9.

In assembling the speed reducer, the movable internal sun gear 9 and the fixed internal sun gears 7, 8 remain concentric to each other when they are held in fitting engagement with each other. Consequently, they can smoothly be brought into mesh with the planet gears 6, and hence the speed reducer can smoothly be assembled.

A speed reducer according to a second embodiment of the present invention will be described below with reference to FIG. 2.

Figure 2:
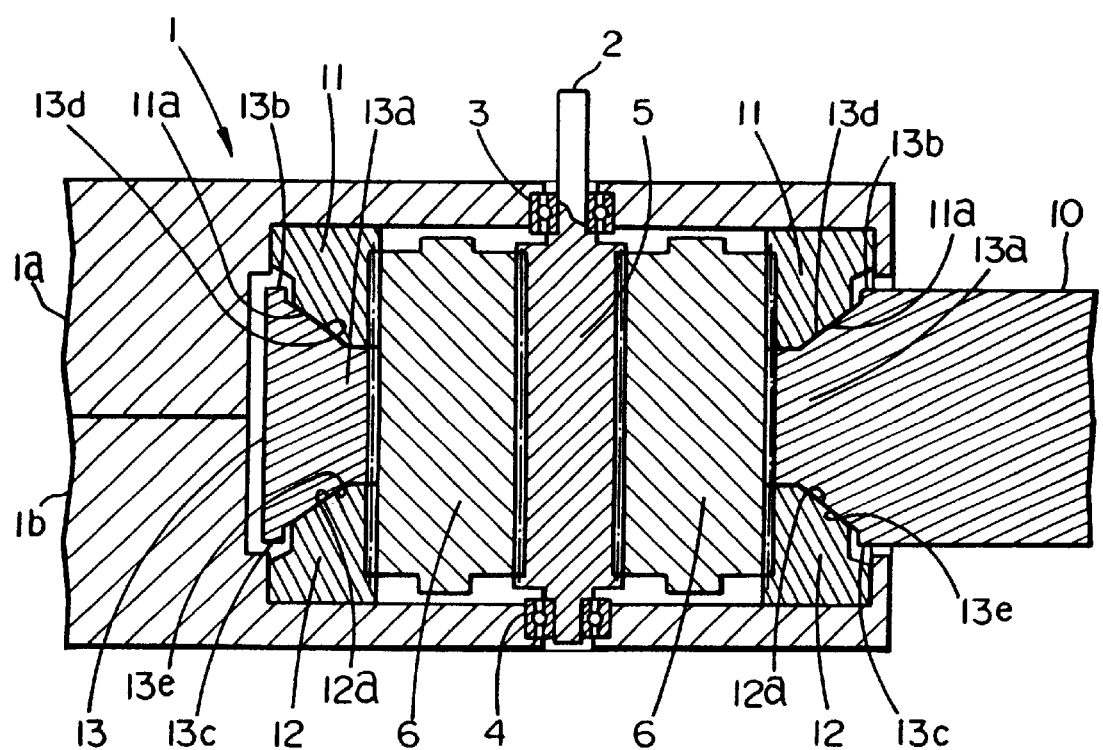
FIG. 2 is an axial cross-sectional view of a speed reducer according to a second embodiment of the present invention.

As shown in FIG. 2, a speed reducer according to a second embodiment of the present invention differs from the speed reducer according to the first embodiment shown in FIG. 1 only with respect to a structure by which a movable internal sun gear and fixed internal sun gears engage each other. Those parts of the speed reducer according to the second embodiment which are identical to those of the speed reducer according to the first embodiment are denoted by identical reference characters, and will not be described in detail below.

In FIG. 2, the speed reducer according to the second embodiment has a pair of cylindrical fixed internal sun gears 11, 12 and a movable internal sun gear 13.

The fixed internal sun gears 11, 12 are fixed to the housing 1 and axially spaced from each other in the axial direction of the input shaft 2. The fixed internal sun gears 11, 12 are held in mesh with the planet gears 6.

The end of the fixed internal sun gear 11 which faces the movable internal sun gear 13 is of a frustoconical shape projecting toward the other fixed internal sun gear 12. The frustoconical end of the fixed internal sun gear 11 has a slanted surface 11a which is inclined to the axis of the input shaft 2. More specifically, the end face of the fixed internal sun gear 11 includes a flat central portion lying perpendicularly to the axis of the input shaft 2, and a surrounding portion extending around the flat central portion as the slanted surface 11a.

Similarly, the end of the fixed internal sun gear 12 which faces the movable internal sun gear 13 is of a frustoconical shape projecting toward the other fixed internal sun gear 11. The frustoconical end of the fixed internal sun gear 12 has a slanted surface 12a which is inclined to the axis of the input shaft 2. More specifically, the end face of the fixed internal sun gear 12 includes a flat central surface lying perpendicularly to the axis of the input shaft 2, and a surrounding surface extending around the flat central surface as the slanted surface 12a.

The movable internal sun gear 13 comprises a cylindrical main body 13a with internal teeth on its inner circumferential surface and a pair of cylindrical outer flanges 13b, 13c extending concentrically and integrally from the respective axially opposite ends of the cylindrical main body 13a.

The cylindrical main body 13a has axially opposite ends each of a frustoconical shape that is concave in the cylindrical main body 13a. Specifically, the axially opposite ends of the cylindrical main body 13a have flat central surfaces lying perpendicularly to the axis of the input shaft 2, and slanted surfaces 13d, 13e extending around the flat central surfaces and inclined to the axis of the input shaft 2 at the same angle as the slanted surface 11a of the fixed internal sun gear 11 and the slanted surface 12a of the fixed internal sun gear 12.

The cylindrical main body 13a is disposed concentrically around the external sun gear 5 on the input shaft 2 and axially positioned concentrically between the fixed internal sun gears 11, 12. The cylindrical main body 13a is held in mesh with the planet gears 6. The projecting frustoconical ends of the fixed internal sun gears 11, 12 are fitted respectively in the concave frustoconical ends of the cylindrical main body 13a. The end faces of the cylindrical main body 13a, i.e., the flat central surfaces and the slanted surfaces 13d, 13e, are held in sliding contact with the end faces of the fixed internal sun gears 11, 12, i.e., the flat central surfaces and the slanted surfaces 11a, 12a.

In the present embodiment, the outer flanges 13b, 13c of the movable internal sun gear 13 are of an inside diameter greater than the outside diameters of the ends of the fixed internal sun gears 11, 12. Therefore, the outer flanges 13b, 13c are disposed respectively around the fixed internal sun gears 11, 12 with gaps left between the outer flanges 13b, 13c and the outer circumferential surfaces of the ends of the fixed internal sun gears 11, 12.

In the present embodiment, each of the sliding contact surfaces of the movable internal sun gear 13 and the fixed internal sun gears 11, 12, i.e., each of the flat central surfaces and the slanted surfaces 13d, 13e of the axially opposite end faces of the movable internal sun gear 13, and the flat central surfaces and the slanted surfaces 11a, 12a of the axially opposite end faces of the fixed internal sun gears 11, 12 has a self-lubricating coating of PTFE or molybdenum disulfide, for example.

Other structural details of the speed reducer according to the second embodiment are identical to those of the speed reducer according to the first embodiment.

In the speed reducer according to the second embodiment, the slanted surfaces 13d, 13e of the end faces of the movable internal sun gear 13 are held in sliding contact with the slanted surfaces 11a, 12a of the end faces of the fixed internal sun gears 11, 12 thereby holding the movable internal sun gear 13 and the fixed internal sun gears 11, 12 in concentric relation to each other. Therefore, the speed reducer can operate stably, and can be assembled with ease.

Since each of the sliding contact surfaces of the movable internal sun gear 13 and the fixed internal sun gears 12, 13 has a self-lubricating coating, the rotation can efficiently and smoothly be transmitted from the input shaft 2 to the movable internal sun gear 13.

A speed reducer according to a third embodiment of the present invention will be described below with reference to FIG. 3.

Figure 3:
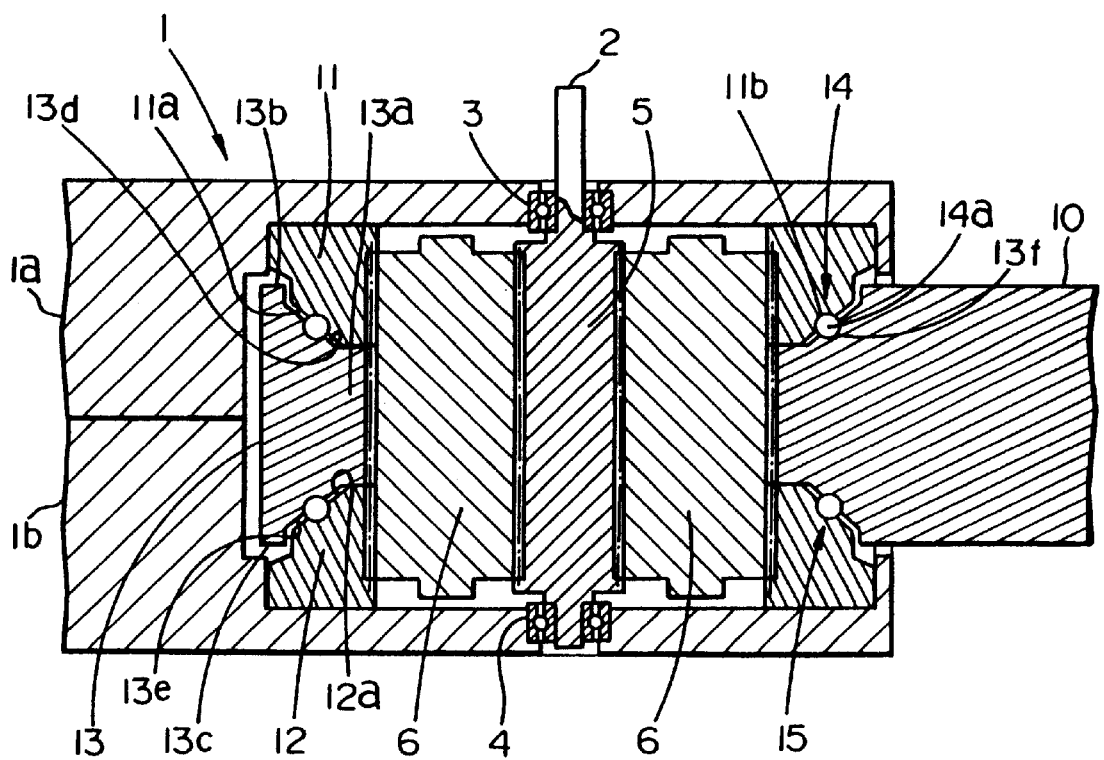
FIG. 3 is an axial cross-sectional view of a speed reducer according to a third embodiment of the present invention.

As shown in FIG. 3, a speed reducer according to a third embodiment of the present invention differs from the speed reducer according to the second embodiment shown in FIG. 2 only with respect to a structure by which a movable internal sun gear and fixed internal sun gears engage each other. Those parts of the speed reducer according to the third embodiment which are identical to those of the speed reducer according to the second embodiment are denoted by identical reference characters, and will not be described in detail below.

In FIG. 3, the speed reducer according to the third embodiment has a pair of cylindrical fixed internal sun gears 11, 12 and a movable internal sun gear 13 which are essentially identical in shape to the fixed internal sun gears 11, 12 and the movable internal sun gear 13 of the speed reducer according to the second embodiment. The fixed internal sun gears 11, 12 and the movable internal sun gear 13 are placed in the housing 1 and held in mesh with the planet gears 6.

In the third embodiment, a rolling bearing mechanism 14 is interposed between the slanted surface 11a of the fixed internal sun gear 11 and the slanted surface 13d of the movable internal sun gear 13, thereby keeping the slanted surfaces 11a, 13d in sliding contact with each other. Likewise, a rolling bearing mechanism 15 is interposed between the slanted surface 12a of the fixed internal sun gear 12 and the slanted surface 13e of the movable internal sun gear 13, thereby keeping the slanted surfaces 12a, 13e in sliding contact with each other.

The rolling bearing mechanism 14 comprises a plurality of balls 14a disposed between the slanted surfaces 11a, 13d and spaced from each other in the circumferential direction thereof, and a plurality of semispherical recesses 11b, 13f defined in the slanted surfaces 11a, 13d. The balls 14a are rollingly received in the respective recesses 11b, 13f. The rolling bearing mechanism 15 is of a structure identical to the rolling bearing mechanism 14.

In the present embodiment, each of the direct sliding contact surfaces of the movable internal sun gear 13 and the fixed internal sun gears 11, 12, i.e., each of the flat central surfaces, which lie perpendicularly to the axis of the input shaft 2, of the end faces of the cylindrical main body 13a of the movable internal sun gear 13, and the flat central surfaces, which lie perpendicularly to the axis of the input shaft 2, of the end faces of the fixed internal sun gears 11, 12 has a self-lubricating coating of PTFE or molybdenum disulfide, for example.

Other structural details of the speed reducer according to the third embodiment are identical to those of the speed reducer according to the second embodiment.

In the speed reducer according to the third embodiment, the slanted surfaces 13d, 13e of the ends of the movable internal sun gear 13 are disposed in facing relation to the respective slanted surfaces 11a, 12a of the ends of the fixed internal sun gears 11, 12, and the rolling bearing mechanisms 14, 15 are interposed between the slanted surfaces 11a, 13d and between the slanted surfaces 13e, 12a thus holding the movable internal sun gear 13 and the fixed internal sun gears 11, 12 in accurately concentric relation to each other. Therefore, the speed reducer can operate stably, and can be assembled with ease.

Because the movable internal sun gear 13 and the fixed internal sun gears 11, 12 are held in engagement with each other through the rolling bearing mechanisms 14, 15 and each of the direct sliding contact surfaces of the movable internal sun gear 13 and the fixed internal sun gears 11, 12 has a self-lubricating coating, the rotation can be transmitted highly smoothly from the input shaft 2 to the movable internal sun gear 13.

In the first embodiment shown in FIG. 1, the ends of the movable internal sun gear 9 are fitted over the respective fixed internal sun gears 7, 8. However, the end of one or both of the fixed internal sun gears 7, 8 may be fitted over the end of the movable internal sun gear 9 in sliding contact therewith.

Furthermore, the rolling bearing mechanisms employed in the third embodiment may be interposed between the end faces, which lie perpendicularly to the axis of the input shaft 2, of the cylindrical main body 9a of the movable internal sun gear 9 and the end faces of the fixed internal sun gears 7, 8.

In the second and third embodiments, the outer flanges 13b, 13c of the opposite ends of the movable internal sun gear 13 are held out of sliding contact with the ends of the fixed internal sun gears 11, 12. However, the outer flanges 13b, 13c of the opposite ends of the movable internal sun gear 13 may be held in sliding contact with the outer circumferential surfaces of the ends of the fixed internal sun gears 11, 12. Moreover, the outer flanges 13b, 13c in the second and third embodiments may be dispensed with.

Although certain preferred embodiments of the present invention have been shown and described in detail, it should be understood that various changes and modifications may be made therein without departing from the scope of the appended claims.

What is claimed is:

1. A speed reducer comprising:
    an external sun gear fixed to an input shaft;
    a pair of fixed internal sun gears nonrotatably fixed in position and disposed around said external sun gear;
    a plurality of planet gears interposed between and held in mesh with said external sun gear and said fixed internal sun gears; and
    a movable internal sun gear rotatably disposed in juxtaposed relation to said fixed internal sun gears in an axial direction of said input shaft and held in mesh with said planet gear, whereby the rotation of said input shaft can be transmitted at a speed reduction ratio to said movable internal sun gear;
    said fixed internal sun gears being spaced from each other in the axial direction of said input shaft, said movable internal sun gear being disposed between said fixed internal sun gears, said movable internal sun gear having ends confronting respective ends of said fixed internal sun gears, said ends of the movable internal sun gear and said ends of the fixed internal sun gears being held in sliding contact with each other to hold said movable internal sun gear and said fixed internal sun gears in concentric relation to each other,
    wherein said ends of the movable internal sun gear have respective slanted surfaces on end faces thereof, and said ends of the fixed internal sun gears which confront said ends of the movable internal sun gear have respective slanted surfaces on end faces thereof, said slanted surfaces being inclined to the axis of said input shaft and held in sliding contact with each other.

2. A speed reducer according to claim 1, wherein one of said ends of the movable internal sun gear and said ends of the fixed internal sun gears which confront said ends of the movable internal sun gear has an outer flange fitted over the other confronting end in sliding contact therewith.

3. A speed reducer according to claim 1, further comprising:
    rolling bearing mechanisms interposed between said ends of the movable internal sun gear and said ends of the fixed internal sun gears which confront said ends of the movable internal sun gear, for assisting said movable internal sun gear in rotating with respect to said fixed internal sun gears.

4. A speed reducer according to any one of claims 1, 2 and 3, wherein each of said ends of the movable internal sun gear and said ends of the fixed internal sun gears has a self-lubricating coating.

5. A speed reducer comprising:

an external sun gear fixed to an input shaft;

a pair of fixed internal sun gearsnonrotatably fixed in position and disposed around said external sun gear;

a plurality of planet gears interposed between and held in mesh with said external sun gear and said fixed internal sun gears; and a movable internal sun gear rotatably disposed in juxtaposed relation to said fixed internal sun gears in an axial direction of said input shaft and held in mesh with said planet gear, whereby the rotation of said input shaft can be transmitted at a speed reduction ratio to said movable internal sun gear;

said fixed internal sun gears being spaced from each other in the axial direction of said input shaft, said movable internal sun gear being disposed between said fixed internal sun gears, said movable internal sun gear having ends confronting respective ends of said fixed internal sun gears, said ends of the movable internal sun gears being held in sliding contact with each other to hold said movable internal sun gear and said fixed internal sun gears in concentric relation to each other, wherein said ends of the movable internal sun gear have respective slanted surfaces on end faces thereof, and said ends of the fixed internal sun gears which confront said ends of the movable internal sun gear have respective slanted surfaces on end faces thereof, said slanted surfaces being inclined to the axis of said input shaft and held in sliding contact with each other to keep the movable internal sun gear and the fixed internal sun gears steadily concentric to each other.

* * * * *